(12) United States Patent
Mosciaro

(10) Patent No.: US 11,885,258 B2
(45) Date of Patent: Jan. 30, 2024

(54) DRIVE ASSEMBLY FOR A MOTOR VEHICLE AND RELATIVE CONTROL METHOD

(71) Applicant: FERRARI S.P.A., Modena (IT)

(72) Inventor: Luigi Mosciaro, Modena (IT)

(73) Assignee: FERRARI S.p.A., Modena (IT)

( * ) Notice: Subject to any disclaimer, the term of this patent is extended or adjusted under 35 U.S.C. 154(b) by 0 days.

(21) Appl. No.: 18/297,950

(22) Filed: Apr. 10, 2023

(65) Prior Publication Data

US 2023/0332534 A1    Oct. 19, 2023

(30) Foreign Application Priority Data

Apr. 14, 2022  (IT) .................. 102022000007469

(51) Int. Cl.
 *F02B 37/18*   (2006.01)
(52) U.S. Cl.
 CPC ................. *F02B 37/183* (2013.01)
(58) Field of Classification Search
 CPC .................................................. F02B 37/183
 See application file for complete search history.

(56) References Cited

U.S. PATENT DOCUMENTS

| | | | | |
|---|---|---|---|---|
| 8,516,814 B2 * | 8/2013 | Okada | ............... | F01N 13/009 60/602 |
| 9,435,256 B2 * | 9/2016 | Shinoda | ............... | F01N 13/107 |
| 9,995,228 B2 | 6/2018 | Zhang | | |
| 10,190,486 B2 * | 1/2019 | Ali Khan | ............... | F02B 37/183 |
| 10,704,461 B2 * | 7/2020 | Gerard | ............... | F02B 37/013 |
| 2008/0098733 A1 * | 5/2008 | Dickerson | ............... | F02B 37/18 60/605.1 |
| 2011/0126812 A1 * | 6/2011 | Miyashita | ............... | F02B 37/025 123/703 |
| 2012/0060492 A1 | 3/2012 | Pursifull et al. | | |
| 2018/0058289 A1 | 3/2018 | Lee et al. | | |

FOREIGN PATENT DOCUMENTS

DE    102017129862 A1    6/2018

OTHER PUBLICATIONS

Italian Search Report for Application No. 102022000007469; Filing Date: Apr. 14, 2022; dated—Nov. 3, 2022, 7 pages.

* cited by examiner

*Primary Examiner* — Jesse S Bogue
(74) *Attorney, Agent, or Firm* — CANTOR COLBURN LLP

(57) ABSTRACT

The description relates to a drive assembly with an internal combustion engine, a turbocharger designed to supercharge said internal combustion engine and a catalysing system; the drive assembly comprises: a first wastegate duct interposed between the turbine and the catalysing system and a first wastegate valve movable between a first and a second position; the drive assembly comprises a second duct interposed between said exhaust duct and said catalysing system; and a second bypass valve movable between a third position, in which it fluidly connects said exhaust duct and the catalysing system so as to covey said mixture along the second duct bypassing the entire turbine, thus heating said catalysing system, and a fourth position, in which it fluidly isolates said second duct from said exhaust duct.

6 Claims, 4 Drawing Sheets

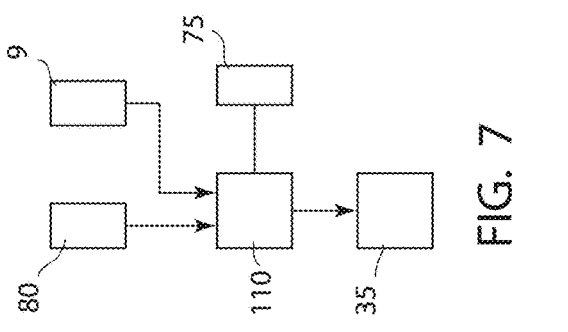
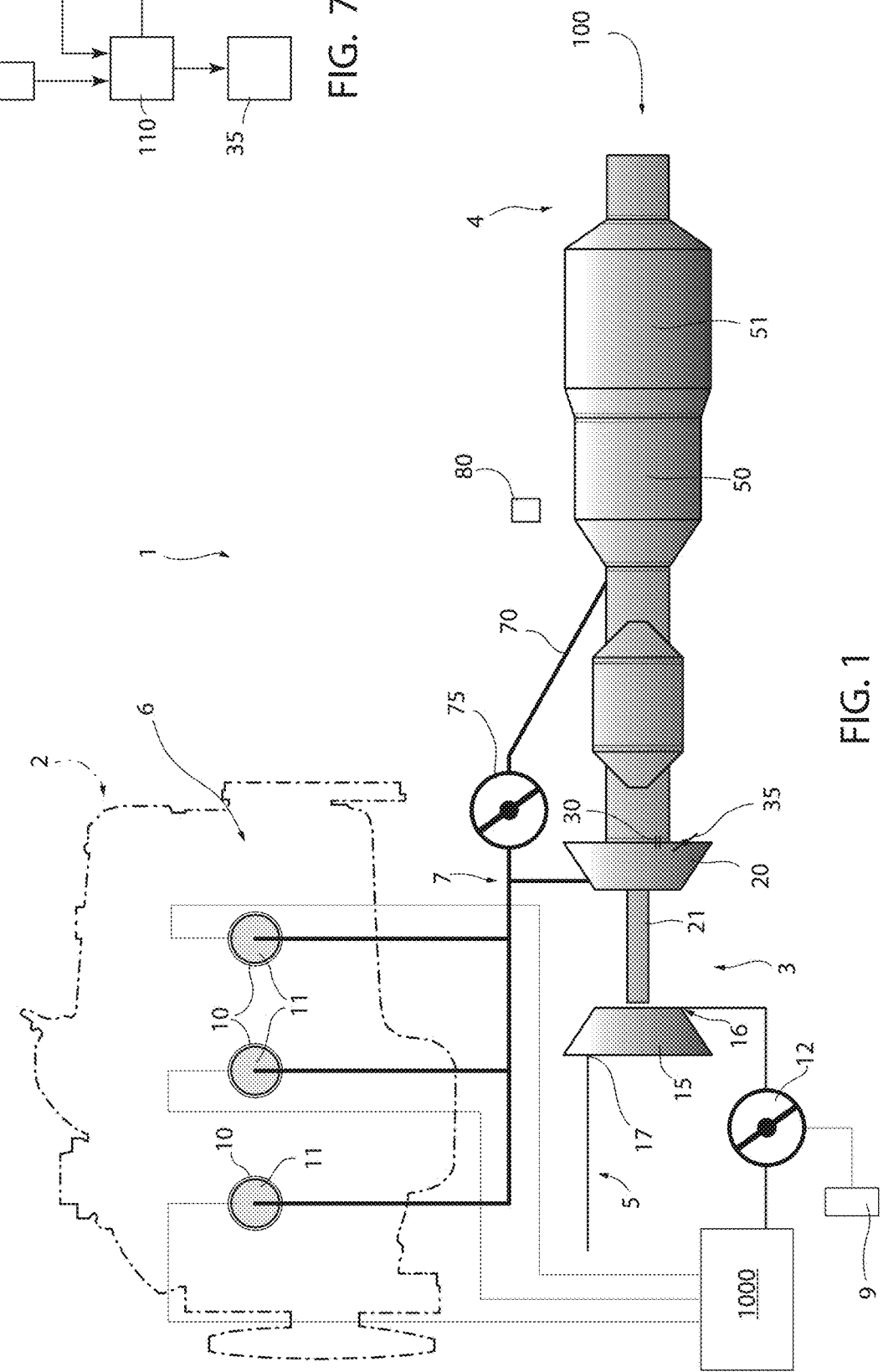
FIG. 7
FIG. 1

DRIVE ASSEMBLY FOR A MOTOR VEHICLE AND RELATIVE CONTROL METHOD

CROSS-REFERENCE TO RELATED APPLICATIONS

This patent application claims priority from Italian patent application no. 102022000007469 filed on Apr. 14, 2022, the entire disclosure of which is incorporated herein by reference.

TECHNICAL FIELD

The invention relates to a drive assembly for a motor vehicle.

The invention further relates to a method to control a drive assembly for a motor vehicle.

BACKGROUND

Drive assemblies for a motor vehicle are known, which basically comprise:
- an internal combustion engine provided with an intake duct and an exhaust duct;
- a control accelerator to regulate the operation of the internal combustion engine;
- a turbocharger designed to supercharge the internal combustion engine, namely to increase the density, the pressure and the air flow rate inside the intake duct in order to increase the filling coefficient and, hence, the torque and the power of the internal combustion engine; and
- a catalysing system arranged in series to the exhaust duct and designed to reduce the quantity of polluting substances released into the atmosphere at an outlet of the drive assembly.

More in detail, the turbocharger comprises, in turn:
- a compressor having an intake section, which is arranged in the area of an inlet of the drive assembly open towards the outside, and a delivery section, which is fluidly connected to the intake duct of the internal combustion engine; and
- a turbine, which can rotate on the same shaft as the compressor and is caused to rotate by gases flowing in the exhaust duct of the engine.

In other words, the gases flowing in the exhaust duct cause the rotation of the turbine, which, in turn, operates the compressor, which performs the supercharging of the internal combustion engine.

According to the prior art, the drive assembly further comprises:
- a control valve, also known as wastegate valve, which is arranged in the exhaust duct of the internal combustion engine and inside the turbine of the supercharging assembly and is controlled by the operating pressure of the compressor of the supercharging assembly; and
- a wastegate duct, which is interposed between the exhaust duct and the catalysing system and is controlled by the wastegate valve.

More precisely, the wastegate valve can be moved, depending on the load requested to the engine, in a progressive manner between:
- an opening position, in which it conveys the maximum flow of air and burnt gas mixture towards the catalysing system, bypassing one or more stages of the turbine; and
- a closing position, in which it prevents the air and burnt gas mixture from flowing along the bypass duct, thus causing the expansion of the entire mixture flow inside the turbine.

In particular, each value of the load requested to the engine corresponds to a predetermined value of the compression ratio of the compressor and, consequently, to a corresponding value of the power requested to the turbine.

Said value of the power requested to the turbine is obtained by properly controlling the wastegate valve.

The wastegate valve is controlled so as to assume the closing position when the engine is at its maximum load, namely delivers its maximum power.

The pollutant conversion efficiency of known catalysing systems reaches its peak at operating temperatures exceeding 350-400 degrees Celsius. Said operating temperature is reached and maintained also thanks to the help of the exhaust gases flowing in the wastegate duct and/or flowing out of the turbine, which still have a significant enthalpy content.

To this aim, when the engine is in a staring condition or in a particularly reduced load condition, in which the operating temperature of the catalysing system could be smaller than the maximum efficiency value, the wastegate valve can be switched to the opening position in order to convey the air and burnt gas mixture with a high enthalpy content towards the catalysing system, thus helping it reach the operating temperature. However, the wastegate duct has a particularly small cross section for the purpose of allowing the internal combustion engine to be controlled at large loads.

The recently introduced anti-pollution standards basically require the reduction of polluting emissions also during the starting phase or when the internal combustion engine operates at small loads, which is what typically happens during urban driving.

This calls for a reduction in the heating times of the catalysing system, namely in the times needed to allow the catalysing system to reach the operating temperature.

Complying with these standards can be hard with the known solutions discussed above, for example due to the fact that the small cross section of the wastegate duct introduces significant fluid-dynamic and thermodynamic losses, which inevitably jeopardize the heating of the catalysing system.

Therefore, the industry needs to comply with said standards in a simple and economic fashion, though without jeopardizing the ability to control the engine at high speeds.

Furthermore, the industry needs to reduce fluid-dynamic losses during the feeding of the exhaust gases flowing inside the wastegate valve into the catalysing system.

DE-A-102017129862, U.S. Pat. No. 9,995,228 and US-A-2012/060492 disclose a drive assembly for a motor vehicle according to the preamble of claim 1 and a method to control a drive assembly for a motor vehicle as defined in the preamble of claim 6.

SUMMARY

The object of the invention is to provide a drive assembly for a motor vehicle, which is capable of fulfilling the needs discussed above.

The aforesaid object is reached by the invention, as it relates to a drive assembly for a motor vehicle as defined in claim 1.

Furthermore, the invention relates to a method to control a drive assembly for a motor vehicle as set forth in claim 6.

BRIEF DESCRIPTION OF THE DRAWINGS

The invention will be best understood upon perusal of the following detailed description of a preferred embodiment, which is provided by way of non-limiting example, with reference to the accompanying drawings, wherein:

FIG. 1 is a functional diagram of a drive assembly according to the invention;

FIG. 7 is a functional diagram of further components of the drive assembly of FIGS. 1 to 6.

DESCRIPTION OF EMBODIMENTS

Figure 2:
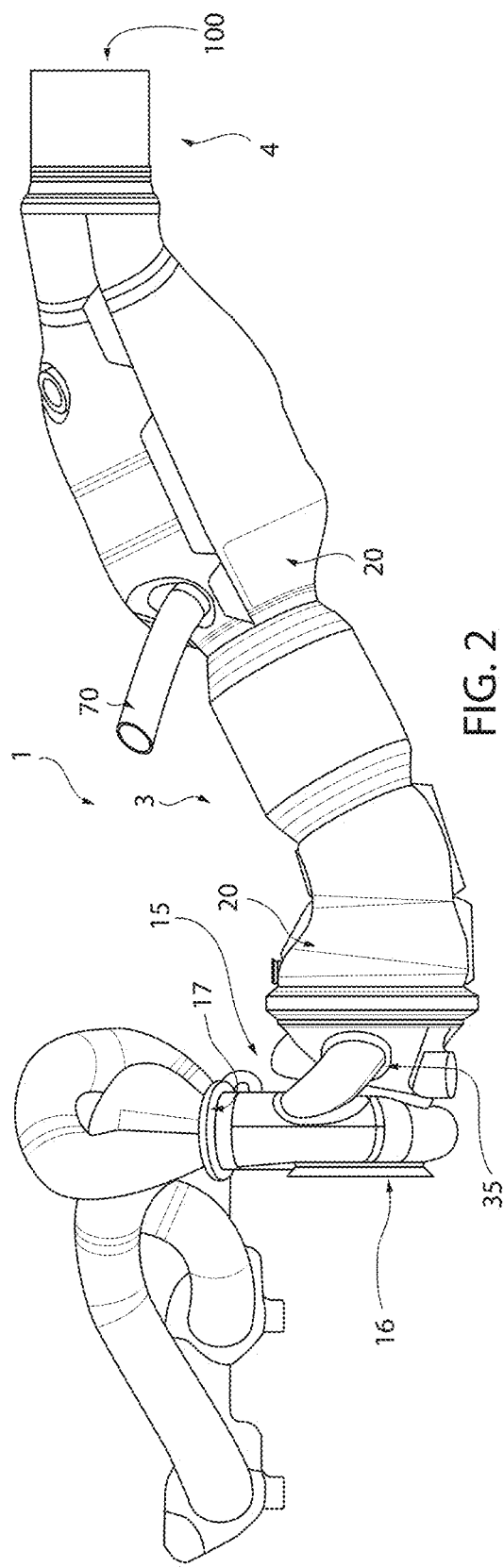
FIGS. 2 and 3 show, in a side view, some details of the drive assembly of FIG. 1, with parts removed for greater clarity.
Figure 3:
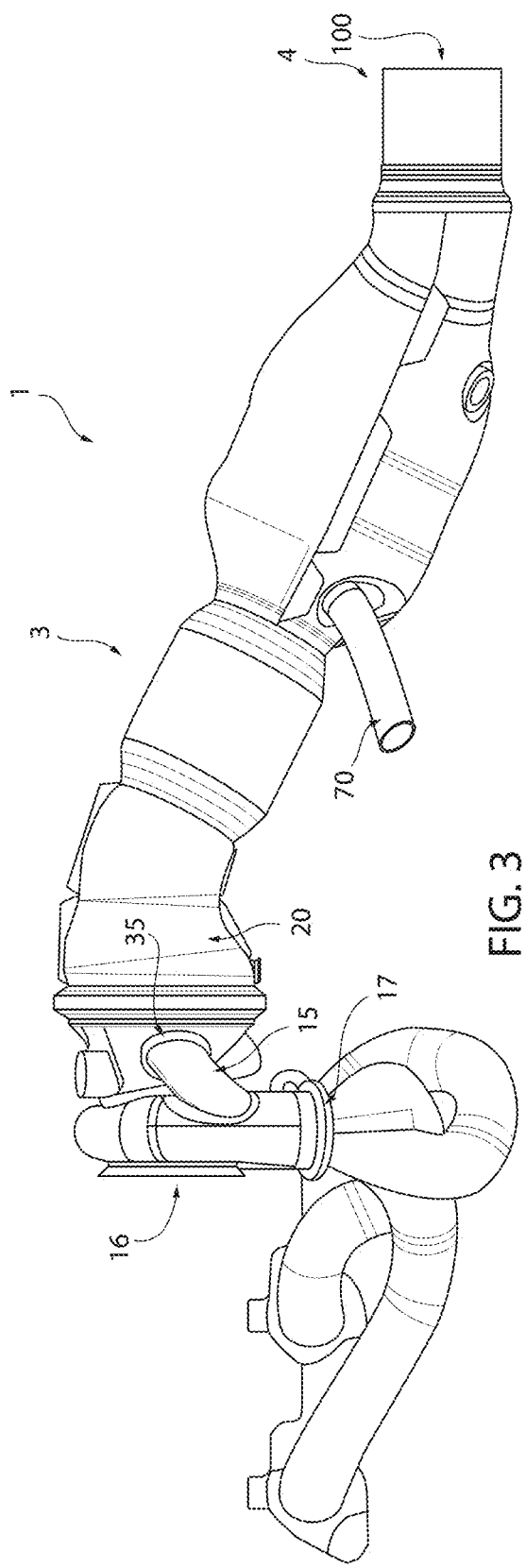
Figure 4:
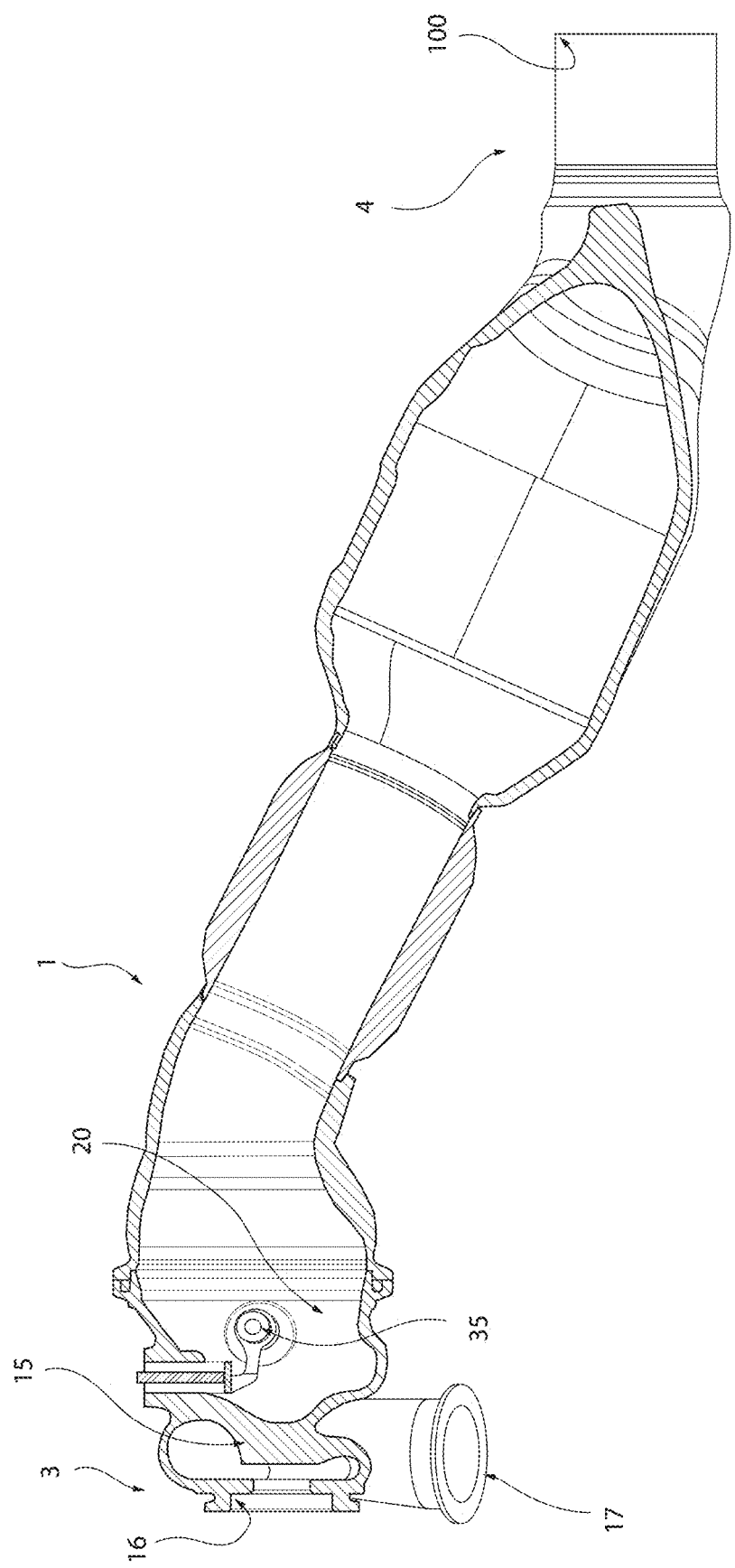
FIG. 4 shows the details of FIG. 3 in a partially sectional view.
Figure 5:
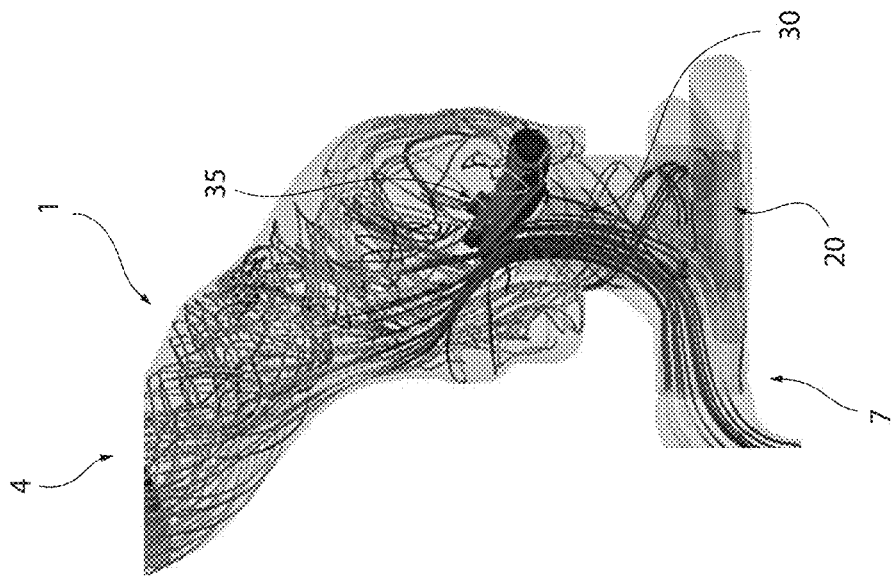
FIGS. 5 and 6 show the development of the speed of the exhaust gases in some details of the drive assembly of FIGS. 1 to 4.
Figure 6:
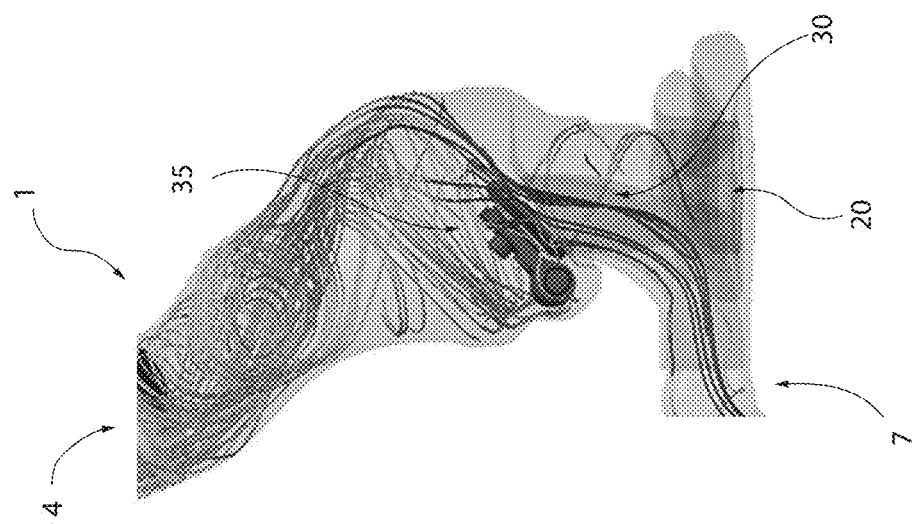

With reference to FIGS. 1 to 6, number 1 schematically shows a drive assembly for a motor vehicle (not shown).

The motor vehicle is, in the specific case shown herein, a production motor vehicle that has to comply with anti-pollution standards.

The drive assembly 1 basically comprises:
an internal combustion engine 2;
a turbocharger 3 designed to supercharge the engine 2; and
a catalysing system 4 designed to reduce the quantity of polluting substances emitted by the engine 2 before they are released into the atmosphere.

The engine 2 comprises, in turn:
an intake duct 5;
a crankcase 6; and
an exhaust duct 7.

The crankcase 6 comprises, in a known manner, a plurality of cylinders 10, inside which respective pistons 11 can slide according to given mechanical laws so as to obtain, in a known manner, a desired engine thermodynamic cycle.

The intake duct 5 is open towards the outside of the motor vehicle so as to allow fresh air to be introduced into the cylinders 10.

The exhaust duct 7 conveys a mixture of air and burnt gases produced by the thermodynamic cycle of the engine 2.

The internal combustion engine 2 further comprises an accelerator 9 designed to regulate the internal combustion engine 2.

More in particular, the position of the accelerator 9 regulates, in a known manner, the opening of one single intake valve 12 arranged along the intake duct 5, which controls the flow rate of the air and fuel mixture fed into the cylinders 11.

The intake valve 12 controls the flow of air to a plenum 1000, which is fluidly connected to the cylinders 10 and is also arranged along the intake duct 5.

In this way, the position of the accelerator 9 defines the load acting upon the internal combustion engine 2.

The turbocharger 3 is designed to increase the flow rate, the pressure and the density of the fresh air conveyed in the intake duct 5, so as to increase the filling coefficient and, consequently, the torque and the power delivered by the engine 2.

The turbocharger 3 basically comprises, in turn:
a compressor 15 having an intake section 16, which is open towards the atmosphere, and a delivery section 17, which fluidly communicates with the plenum 1000 of the engine 2 through the intake valve 12;
a turbine 20, which is fluidly connected to the exhaust duct 7 and is flown through by the air and burnt gas mixture flowing out of the engine 2; and
a rotary shaft 21, to which the compressor 15 and the turbine 20 are splined.

The air and burnt gas mixture flowing out along the exhaust duct 7 determines the rotation of the turbine 20 and the consequent dragging of the compressor 15.

The drive assembly 1 further comprises:
a wastegate duct 30 interposed between a stage of the turbine 20 and the catalysing system 4;
a wastegate valve 35 interposed along the wastegate duct 30.

More in detail, the valve 35 is movable between:
an opening position, in which it conveys the maximum flow of air and burnt gas mixture towards the catalysing system, bypassing part of the turbine 20; and
a closing position, in which it prevents the air and burnt gas mixture from flowing along the wastegate duct 30 and conveys the entire flow of air and burnt gas mixture into the turbine 20.

The wastegate valve 35 can also be switched to a plurality of intermediate positions between the opening position and the closing position.

More in detail, the valve 35 could allow for an inevitable leak of a minimum flow of air and burnt gas mixture along the wastegate duct 30, when it is in the closing position.

The catalysing system 4 comprises, in turn, with reference to a flowing direction of the air and burnt gas mixture from the turbine 20 towards an exhaust 100 of the drive assembly 1:
a pre-catalytic converter 50 arranged in series to the turbine 20; and
a catalytic converter 51 arranged downstream of the pre-catalytic converter 50 and interposed between the pre-catalytic converter 50 and the exhaust 100.

The pre-catalytic converter 50 and the catalytic converter 51 are shaped like cylindrical segments. The pre-catalytic converter 50 comprises, at an axial end of its opposite the catalytic converter 51, a diverging segment, moving from the turbine 20 towards the exhaust 100.

The catalytic converter 51 is interposed between a pair of segments, namely a diverging and converging one, respectively, moving from the turbine 20 towards the exhaust 100.

The catalysing system 4 is designed to house suitable oxidation and reduction reactions of the polluting substances contained in the air and burnt gas mixture, so as to turn them into harmless substances to be released through the exhaust 100.

The conversion efficiency of the catalysing system 4 also is a function of the operating temperature of the catalysing system 4.

In particular, in order to comply with anti-pollution standards, the temperature of the catalysing system 4 has to be around four-hundred degrees Celsius.

Advantageously, the drive assembly 1 further comprises:
a further bypass duct 70 interposed between the exhaust duct 7 and the catalysing system 4; and
a further bypass valve 75 interposed along said further bypass duct 70;

The valve 75 is movable between:
- an opening position, in which it fluidly connects the exhaust duct 7 and the catalysing system 4, so as to convey the air and burnt gas mixture inside the bypass duct 70 bypassing the turbine 20, thus heating the catalysing system 4; and
- a closing position, in which it obstructs the bypass duct 70, thus isolating it from the exhaust duct 7.

The drive assembly 1 further comprises a control unit 110 (schematically shown in FIG. 7), which is programmed to control the valves 35, 75 according to different strategies.

The control unit 110 is further programmed to detect the operating state of the engine 2, in particular the cold start condition, the driving cycle condition or the condition of cooled engine 2 in a phase following the starting phase.

The control unit 110 is preferably programmed to alternatively perform the following functions:
- placing the valve 75 in the opening position and the valve 35 in the closing position, in a first operating condition of the engine 2; and
- placing the valve 75 in the closing position and regulating the valve 35 in case the engine 2 operates in a second operating condition of the engine 2.

The first operating condition corresponds to a temperature of the catalysing system 4 below a threshold value corresponding to the maximum efficiency temperature. Said first condition is reached during a cold start phase or in case of partial loads of the engine 2, for example during urban driving, and/or in case of need to take the catalysing system 4 back to the desired operating temperature, for instance in case the engine 2 is hybrid.

Alternatively, the control unit 110 is programmed to place the valves 35, 75 in respective intermediate positions between the corresponding closing positions or to place both valves 35, 75 in the opening positions, in the first operating condition of the engine 2, in particular in case of need to take the catalysing system 4 back to the desired operating temperature.

The second operating condition corresponds to a temperature of the catalysing system 4 exceeding the threshold value corresponding to the maximum efficiency temperature. Said second condition is reached at large loads of the engine 2.

The terms "partial loads" and "large loads" indicate, in this description, loads that are smaller and greater than a threshold value, respectively.

In particular, in the second operating condition, the control unit 110 is programmed to associate each value of the load requested to the engine 2 through the accelerator 9 with a given position of the wastegate valve 35 intermediate between or coinciding with the aforesaid closing position and opening position.

The control unit 110 is programmed to associate:
- each value of the load requested to the engine 2 through the accelerator 9 with a corresponding value of the compression ratio of the compressor 15;
- each value of the compression ratio of the compressor 15 with a corresponding value of the power requested to the turbine 20 to drag the compressor 15; and
- to control the wastegate valve 35 so as to cause the expansion, in the turbine 20, of a flow of air and fuel gas mixture that is such as to cause the compressor 15 to rotate with a rotation speed that allows the necessary compression ratio to be reached.

In the specific case shown herein, the control unit 110 is programmed to simulate the temperature T of the catalysing system 4 and to generate:
- a first signal associated with the first operating condition of the engine 2, when the simulated temperature T is lower than a threshold value T0; and
- a second signal associated with the second operating condition of the engine 2, when the simulated temperature T is higher than a threshold value T0.

More in particular, the drive assembly 1 comprises a sensor 80 (FIGS. 1 and 7) designed to detect the temperature of the catalysing system 4.

The control unit 110 is programmed, in particular, to simulate the temperature T also based on the temperature measured by the sensor 80.

The diameter of the bypass duct 70 preferably is greater than the diameter of the wastegate duct 30.

The bypass duct 70 is preferably joined to the diverging segment of the pre-catalytic converter 50.

In use, the engine 2 is supplied with fresh air by the intake duct 5 and emits a mixture of air and burnt gases in the exhaust duct 7.

The mixture of air and burnt gases flows from the exhaust duct 7 to the catalysing system 4, where a series of oxidation-reduction reactions of the polluting substances contained in the aforesaid mixture take place.

Said mixture heats the catalysing system 4.

Subsequently, the mixture of air and burnt gases with reduced quantities of polluting substances is released into the atmosphere through the exhaust 100.

The control unit 110 simulates the temperature T of the catalysing system 4 and generates the first signal associated with the first operating condition of the engine 2 or the second signal associated with the second operating condition of the engine 2.

Hereinafter, the operation of the drive assembly 1 will be described with reference to the first operating condition, namely during a staring phase or while the engine 2 operates at small loads.

In these conditions, the temperature T is below the threshold value T0.

Therefore, the control unit 110 places the valve 35 in the closing position and the valve 75 in the opening position.

Consequently, the air and burnt gas mixture flows out of the exhaust duct 7 and reaches the pre-catalytic converter 50 through the duct 70, bypassing the turbine 20.

The mixture reaching the pre-catalytic converter 50 has a high temperature and a large enthalpy content and, hence, is capable of heating the catalysing system 4 in a small amount of time.

Therefore, the catalysing system 4 quickly reaches the maximum efficiency operating temperature, consequently decreasing the polluting emissions of the engine 2.

Alternatively, the control unit 110 is programmed to place the valves 35, 75 in respective intermediate positions between the corresponding closing and opening positions or to place both valves 35, 75 in the opening positions, in particular in case of need to take the catalysing system 4 back to the desired operating temperature.

On the contrary, in the second operating condition, namely in the presence of large loads of the engine 2 exceeding the threshold value, the temperature T is higher than the threshold value T0.

Therefore, the control unit 110 places the valve 75 in the closing position and places the valve 35 in an intermediate position between or coinciding with the opening and closing positions.

Consequently, the air and burnt gas mixture does not flow through the duct 70.

The control unit 110 associates each value of the load requested to the engine 2 through the accelerator 9 with a predetermined value of the compression ratio of the compressor 15; associates each value of the compression ratio of the compressor 15 with a corresponding value of the power requested to the turbine 20 to drag the compressor 15; and controls the wastegate valve 35 so as to cause the expansion, in the turbine 20, of a flow of air and fuel gas mixture that is such as to cause the compressor 15 to rotate with a rotation speed that allows the necessary compression ratio to be reached.

An analysis of the features of the drive assembly 1 and of the relative control method according to the invention clearly reveals the advantages that can be obtained with them.

More in detail, the drive assembly 1 comprises a further valve 75, which is movable between:
the opening position, in which it fluid-dynamically connects the exhaust duct 7 and the catalysing system 4, so as to convey the air and burnt gas mixture inside the bypass duct 70 and bypassing the turbine 20; and
the closing position, in which it obstructs the bypass duct 70.

Consequently, the mixture reaching the pre-catalytic converter 50 has a high temperature and a large enthalpy content, since it has not lost enthalpy in order to cause the rotation of the turbine 20, and, hence, is capable of heating the catalysing system 4 in a small amount of time. In this way, the catalysing system 4 quickly reaches the maximum efficiency operating temperature, in the first operating condition of the engine 2.

By so doing, it is possible to comply with the aforesaid anti-pollution standards, which provide, during the starting phase or at small loads of the engine 2, for a reduction in the heating times of the catalysing system 4.

The drive assembly 1 reaches the advantages indicated above, ensuring, at the same time, the fulfilment of the requirements of the standards at large loads of the engine 2. This is due to the fact that the control unit 110 switches the valve 35 between the respective maximum opening and closing positions, when the engine 2 is in the second operating condition and the valve 75 is in the closing position.

The diameter of the bypass duct 70 is greater than the diameter of the wastegate duct 30.

In this way, the wastegate valve 30 with a smaller diameter ensures an utmost ability to control the engine 2 in the second operating condition, whereas the bypass duct 70 with the larger diameter reduces fluid-dynamic and thermodynamic losses, ensuring a quick heating of the catalysing system 4.

The wastegate valve 70 is well joined to the diverging segment of the pre-catalytic converter 50 in order to reduce load losses and heat exchanges inside the bypass duct 70, thus helping further ensure the heating of the catalysing system 4.

Finally, the drive assembly 1 and the control method according to the invention can clearly be subjected to changes and variations, which, though, do not go beyond the scope of protection set forth in the appended claims.

The invention claimed is:

1. A drive assembly (1) for a motor vehicle, comprising:
an internal combustion engine (2) comprising, in turn, at least one intake duct (5), through which fresh air can flow, and at least one exhaust duct (7), through which a burnt air and gas mixture can flow;
a turbocharger (3) designed to supercharge said internal combustion engine (2); and
a catalysing system (4) arranged in series to said exhaust duct (7);
said turbocharger (3) comprising, in turn:
a compressor (15), which can be operated to increase the fresh air flow rate flowing, in use, through said intake duct (5); and
a turbine (20), which is operatively connected to said compressor (15), can be flown through by said mixture and is designed to drag the compressor (15);
said drive assembly (1) further comprising:
a first wastegate duct (30) interposed between said turbine (20) and said catalysing system (4); and
a first wastegate valve (35) designed to control said first wastegate duct (30);
said first valve (35) being movable between:
a first opening position, so as to convey a maximum flow rate of said mixture inside said first wastegate duct (30); and
a second closing position, so as to convey a minimum flow rate of said mixture inside said first wastegate duct (30);
said drive assembly (1) further comprising:
a second duct (70) interposed between said exhaust duct (7) and said catalysing system (4); and
a second bypass valve (75);
said second valve (75) being movable between:
a third position, in which it fluidly connects said exhaust duct (7) and said catalysing system (4) so as to convey said mixture along said second duct (70) bypassing, in use, the entire turbine (20) so as to heat said catalysing system (4); and
a fourth position, in which it fluidly isolates said second duct (70) from said exhaust duct (7);
said drive assembly (1) further comprising a control unit (110) programmed to control said first and second valve (35, 75) and to generate a first signal, when said internal combustion engine (2) is in a first condition, and a second signal, when said internal combustion engine (2) is in a second condition;
characterised in that said control unit (110) is programmed to detect the operating state of said engine (2) and to place:
said second valve (75) in said third position and said first valve (35) in said second position, in said first condition of said engine (2) and in case of a cold start of the engine (2);
said first valve and second valve (35, 75) in corresponding intermediate positions between said first and second position and said third and fourth position, in case, in use, said catalysing system (4) needs to be heated with said engine (2) already running;
said control unit (110) being further programmed to process a third signal associated with a simulated temperature of said catalysing system (4);
said control unit (110) being programmed to generate said first signal when said third signal is below a first threshold value and to generate said second signal when said third signal exceeds said first threshold value;
said drive assembly (7) further comprising a sensor (80) designed to detect a characteristic temperature (T) of said catalysing system (4);
said control unit (110) being further programmed to generate said first or second signal also based on the characteristic temperature (T).

2. The drive assembly according to claim 1, characterised in that said control unit (110) is further programmed to place said second valve (75) in said fourth position and to regulate said first valve (35) between said first and second position depending on the load acting upon said engine (2), in said second condition of the engine (2).

3. The assembly according to claim 1, characterised in that said second bypass duct (70) is joined to a segment (50) of a pre-catalytic converter of said catalysing system (4); said segment (50) being diverging, moving according to a flowing direction of said mixture from said turbine (20) towards an outlet (100) of said drive assembly (1).

4. The assembly according to claim 1, characterised in that a first cross section of said second bypass duct (70) is greater than a second cross section of said first wastegate duct (30).

5. A motor vehicle comprising a drive assembly (1) according to claim 1.

6. A method to control a drive assembly (1) for a motor vehicle; said drive assembly (1) comprising:
- an internal combustion engine (2) comprising, in turn, at least one intake duct (5), through which fresh air can flow, and at least one exhaust duct (7), through which a burnt air and gas mixture can flow;
- a turbocharger (3) designed to supercharge said internal combustion engine (2); and
- a catalysing system (4) arranged in series to said exhaust duct (7);

said turbocharger (3) comprising, in turn:
- a compressor (15), which can be operated to increase the fresh air flow rate flowing, in use, through said intake duct (5); and
- a turbine (20), which is operatively connected to said compressor (15), can be flown through by said mixture and is designed to drag the compressor (15);

said drive assembly (1) further comprising:
- a first wastegate duct (30) interposed between said turbine (20) and said catalysing system (4); and
- a first wastegate valve (35);

said method comprising the step of:
i) moving said first valve (35) between:
- a first opening position, so as to convey a maximum flow rate of said mixture inside said first wastegate duct (30); and
- a second opening position, so as to convey a minimum flow rate of said mixture inside said first wastegate duct (30); and said method further comprising the step of:
ii) moving a second bypass valve (75) between:
- a third position, in which it fluidly connects said exhaust duct (7) and said catalysing system (4) so as to convey said mixture along said second duct (70) bypassing, in use, the entire turbine (20); and
- a fourth position, in which it fluidly isolates said second duct (70) from said exhaust duct (7);

said second duct (70) being interposed between said exhaust duct (7) and said catalysing system (4);

said control method further comprising the steps of:
iii) generating a first signal when said internal combustion engine (2) is in a first condition;
iv) generating a second signal when said internal combustion engine (2) is in a second condition of said engine (2); and
v) placing said second valve (75) in said fourth position and regulating said first valve (35) between said first and second position depending on the load acting upon said engine (2), in said second condition of the engine (2);

said control method being characterized in that it comprises the steps of:
vi) detecting the operating station of said engine (2) and placing:
- said second valve (75) in said third position and said first valve (35) in said second position, in said first condition of said engine (2) and in case of a cold start of the engine (2);
- said first valve and second valve (35, 75) in corresponding intermediate positions between said first and second position and said third and fourth position, in case, in use, said catalysing system (4) needs to be heated with said engine (2) already running;

vii) processing a third signal associated with the simulated temperature of said catalysing system (4);
viii) generating said first signal when said third signal is below a first threshold value and to generate said second signal when said third signal exceeds said first threshold value;
ix) detecting a characteristic temperature (T) of said catalysing system (4) by means of a sensor (80); and
x) generating said first or second signal also based on the characteristic temperature (T).

\* \* \* \* \*